United States Patent [19]

Eschelbach et al.

[11] Patent Number: 4,879,593
[45] Date of Patent: Nov. 7, 1989

[54] METHOD OF AND APPARATUS FOR PERFORMING LOW-VOLTAGE CORRECTION OF HIGH-VOLTAGE DEFLECTION SIGNALS FOR ELECTROSTATIC-DEFLECTION CAMERA TUBES IN A COLOR VIDEO CAMERA

[75] Inventors: Harald Eschelbach, Mannheim; Wolfram Klemmer, Langen, both of Fed. Rep. of Germany

[73] Assignee: Robert Bosch GmbH, Stuttgart, Fed. Rep. of Germany

[21] Appl. No.: 164,014

[22] Filed: Mar. 4, 1988

[30] Foreign Application Priority Data

Mar. 13, 1987 [DE] Fed. Rep. of Germany ....... 3708229

[51] Int. Cl.$^4$ .................. H04N 9/093; H04N 3/23; H04N 5/228; H03K 4/08
[52] U.S. Cl. ..................... 358/51; 358/217; 315/370
[58] Field of Search ............ 358/41, 50, 51, 217; 315/364, 370, 371, 391

[56] References Cited

U.S. PATENT DOCUMENTS 4,409,613 10/1983 Nakamura et al. ............. 358/51

OTHER PUBLICATIONS

Mitsuhiro Kurashige et al., "⅔Inch Magnetic-Focus Electrostatic-Deflection (MS) Camera Tube and Deflection Driver", *NHK Technical Monograph*, No. 35, Mar. 1986, pp. 29-43.

*Primary Examiner*—James J. Groody
*Assistant Examiner*—Randall S. Svihla
*Attorney, Agent, or Firm*—Frishauf, Holtz, Goodman & Woodward

[57] ABSTRACT

After sawtooth wave deflection signals are corrected in a summing circuit for position, magnitude, shape, they are keyed by a blanking circuit, within a blanking interval of the video signal, for briefly inserting a low-voltage reference potential. This is done before the corrected deflection signals are capacitively coupled to high voltage amplifying circuits supplying an electrostatic deflection plate of a camera tube. The high voltage amplifiers are equipped with a clamping circuit timed to clamp the high voltage output to a high voltage reference potential during substantially the same intervals in which the low voltage wave is keyed for insertion of the low voltage reference potential. The vertical deflection signals are keyed at low voltage and clamped at high voltage at the vertical scanning frequency. The horizontal deflection signals may be keyed and clamped either at the horizontal scanning frequency or, for saving of expense and equipment, at the vertical scanning frequency. It is particularly convenient for the clamping to take place at the beginning of the blanking interval of the video signal within which keying and clamping pulses are applied to the switching circuits involved in the keying and clamping.

8 Claims, 2 Drawing Sheets

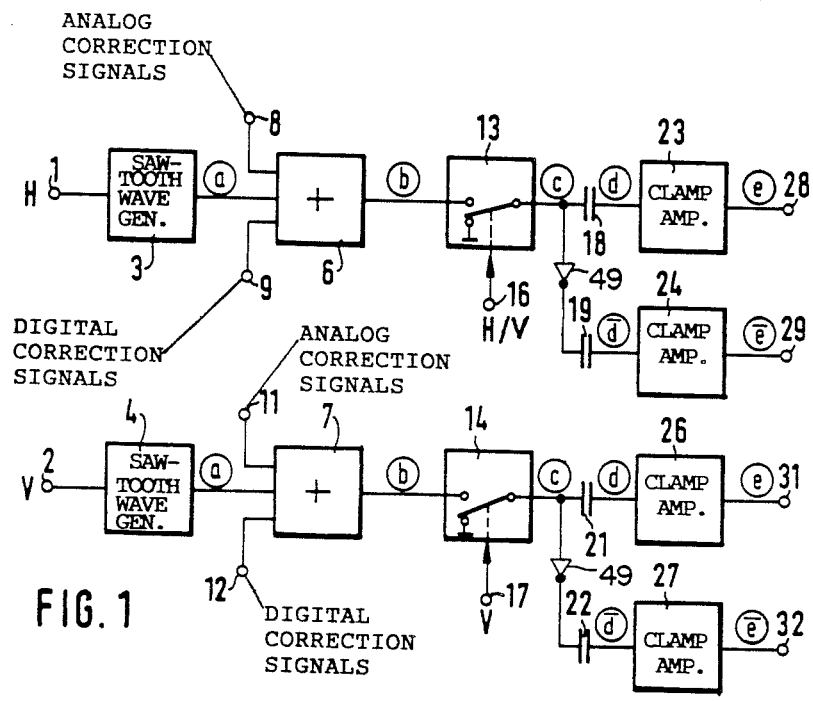

METHOD OF AND APPARATUS FOR PERFORMING LOW-VOLTAGE CORRECTION OF HIGH-VOLTAGE DEFLECTION SIGNALS FOR ELECTROSTATIC-DEFLECTION CAMERA TUBES IN A COLOR VIDEO CAMERA

This invention concerns producing corrected deflection signals for electrostatic television camera tubes first generated at low voltage and then combined with correction signals added to them to modify signal position, amplitude and shape (waveform), after which the resulting corrected deflection signals are capactively converted into high voltage horizontal and vertical deflection signals. The color television camera in these cases usually includes three television camera tubes of the electrostatic deflection type.

In color television tubes of that type, the deflection voltages of H and V deflection circuits are supplied to the H and V deflection plates of the three camera tubes serving respectively for the three primary colors. H and V deflection plates of the three camera tubes are not completely identical to each other, but may differ from one another with respect to mechanical properties such as position and size. The deflection relations of the respective electrodes in the different camera tubes are thus not precisely identical as the result of the corresponding properties of the deflection plates. In other words, a color error alignment and an inter-color shift occurs in the reproduced picture.

For correction of this color alignment error, circuits are known, for example, from U.S. Pat. No. 4,409,613, in which the deflection signals supplied to the deflection plate are correctly modified by addition of correction signals at the level of the deflection voltage, which means at a high voltage. This arrangement has the disadvantage that the circuit expense is relatively great on account of the coupling in of correction signals to the high voltage deflection signals, for example, by the use of high voltage transistors and (necessarily) special circuits.

In the article entitled "⅔-Inch Magnetic-Focus Electrostatic-Deflection (MS) Camera Tube and Deflection Driver" by M. Kurashige et al., at pages 29 to 43 of the periodical NHK Technical Monograph, No. 35, March, 1986, a deflection circuit has already appeared for electrostatic deflection television tubes (see particularly FIG. 3.12 at page 37) in which both the generation of the sawtooth signals and also the addition of various correction signals for modifying the position, size and shape of the deflection signals at low voltage takes place and then the deflection signals are converted into high voltage signals for the electrostatic deflection means, in each case being coupled through a capacitor to a high voltage circuit to put the deflection waves at a high voltage DC level. The DC voltage necessary for the scanning pattern location is set or adjusted by means of four potentiometers per camera tube, since the DC voltage must be applied to each of the four deflection plates. That involves, however, additional expense in components (for these camera tubes, twelve potentiometers in all) and requires a great deal of time for precise positioning and eventually repositioning of the individual scanning patterns. This known circuit, moreover, has the disadvantage that a pattern shift can be produced by DC voltage drift of the final stage amplifier preceding the capacitive coupling.

SUMMARY OF THE INVENTION

It is an object of the present invention to provide a method and apparatus for correcting deflection signals in electrostatic-deflection color television camera tubes, in which the corrected deflection signals are generated at low voltage and every possible DC voltage drift of the deflection amplifier outputs is prevented.

Briefly, prior to the step of capacitive conversion into high voltage signals, the low voltage corrected H and V deflection signals are blanked out with insertion of a reference voltage level for intervals within the respective H and V blanking intervals of the color video signals and after the conversion to high voltage, the resulting high voltage H and V deflection signals are clamped to a high voltage reference potential during the same intervals in which the respectively corresponding corrected low voltage signals were blanked and a low-voltage reference potential inserted.

In a modification of the method and apparatus just described, H deflection signals as well as the V deflection signals are blanked and later changed only during the vertical blanking interval.

The invention has the advantage that by compensation of DC voltage drift of the final deflection signal amplifier, both the stability of the picture positions with respect to each other as well as the stability of the various focusing potentials are assured. For the practical use of the above-described method, the invention preferably makes use of clamping circuits with a negative feedback amplifier, having another feedback branch including, in series, a clamping switch and a control differential amplifier supplied with a high reference voltage, but such circuits are better described in the detailed description that follows.

BRIEF DESCRIPTION OF THE DRAWINGS:

The invention is further described by way of illustrative example with reference to the annexed drawings, in which:

FIG. 1 is a block circuit diagram of apparatus for carrying out the method of the invention;

FIG. 2a is a graph of the wave form at the outputs of the sawtooth generators 3 and 4 of FIG. 1;

FIG. 2b is a graph of the outputs of the summing circuits 6 and 7 of FIG. 1;

FIG. 2c is a graph of the outputs of the blanking circuits 13 and 14 of FIG. 1;

FIG. 2d is a graph of the inputs of the clamp amplifiers 23, 24, 26 and 27 of FIG. 1;

FIG. 2e is a graph of the outputs provided by the clamp amplifiers at the terminals 28, 29, 31 and 32.

Figure 3:
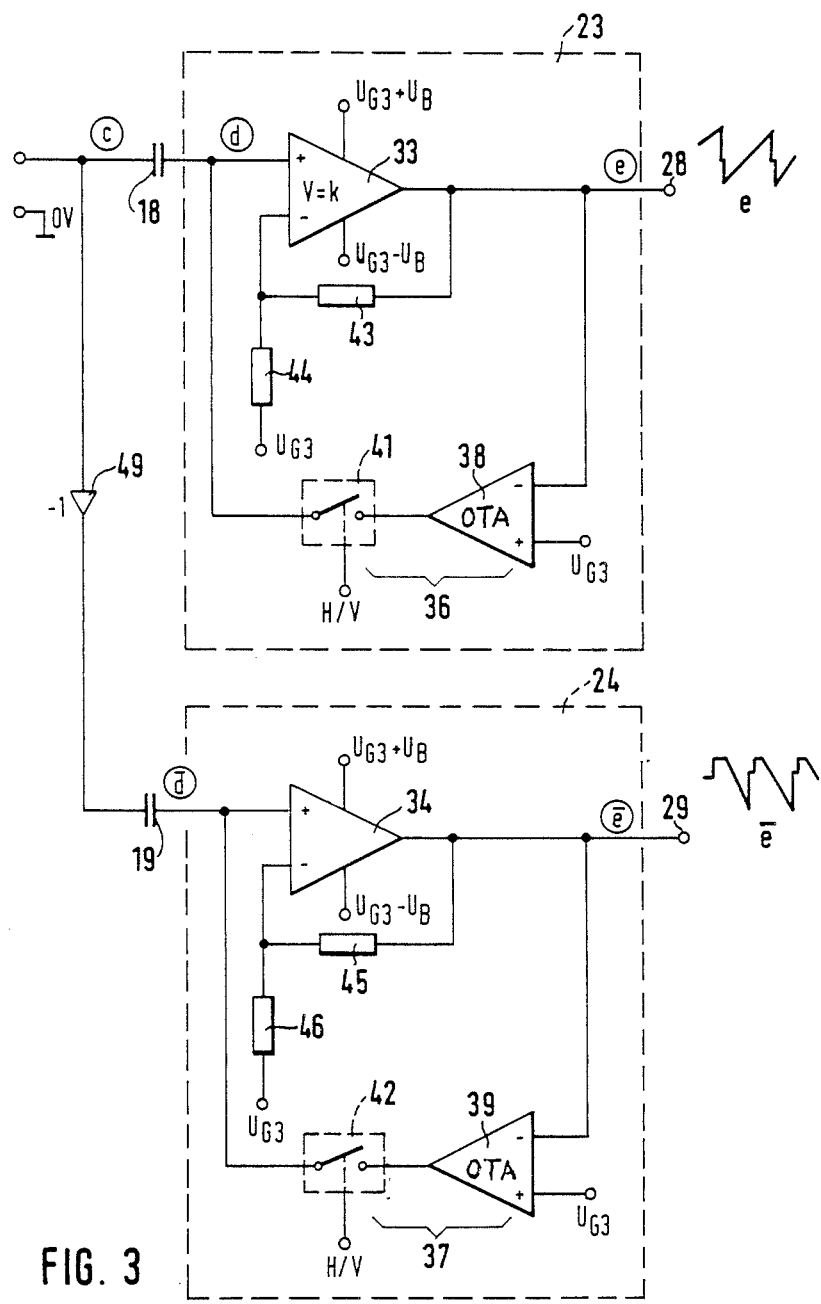
FIG. 3 is a clamping circuit for use in the apparatus and method of the invention.

DESCRIPTION OF THE ILLUSTRATED EMBODIMENTS:

FIG. 1 is composed of two substantially identical circuit block diagrams with appropriately different reference numerals, the first relating to horizontal deflection and the second relating to vertical deflection. Horizontal synchronizing pluses are provided at the input terminal 1 and vertical synchronizing pulses at the input terminal 2. These are furnished respectively to a horizontal deflection sawtooth wave generator 3 and vertical deflection sawtooth wave generator 4. These sawtooth wave generators produce sawtooth wave signals at low voltage, as illustrated in FIG. 2a, respectively at the horizontal scanning frequency and at the vertical scanning frequency. The sawtooth wave output of the generator 3 is supplied to an input of the summing circuit 6; similarly the sawtooth wave output of the wave generator 4 is supplied to an input of the summing circuit 7. At first additional inputs 8 and 11 respectively of the summing circuit generators 6 and 7 analog correction signals are supplied and at second inputs 9 and 12 of the respective summing circuits 6 and 7 digital correction signals are supplied, for control of the scanning pattern with respect to position, size, shape, etc. As is known, for this purpose, a DC voltage can be supplied for position shift of the sawtooth signals, a sawtooth signal can be added for adjustment of the magnitude of the sawtooth signal, and ramp or parabolic signals can be superimposed for control of the linearity and slope of the scanning pattern, in each case by an analog signal correction. There is also, however, the possibility of producing more complex curve shapes with the help of digitally generated signals which may also contain a DC voltage component. Both the digital and analog inputs are shown in FIG. 1 for the correction signals, but it is not necessary to have both, since all the types of corrections could be added on an analog basis or on a digital basis alone.

It should be mentioned that the superposition of the DC signal, which must be transmitted by the circuits all the way to the deflection plates, is particularly important in the case of color television cameras with more than one camera tube, since it is necessary for the shift of the scanning patterns for pattern congruence.

FIG. 2b shows the superposition of a DC voltage correction signal of +0.5 volt, resulting in shifting the signal of FIG. 2b in the positive (upward) direction relative to the signal of FIG. 2a, with reference to the 0 volt level.

The output of the summing amplifier 6 is supplied to a blanking circuit 13 and likewise the output of the summing amplifier 7 is supplied to a blanking circuit 14. In the blanking circuits, horizontal and vertical scanning frequency pulses respectively supplied at the terminals 16 and 17 occurring within the horizontal blanking interval and the vertical blanking interval, respectively, of the video signals interrupt the furnishing of the input of the summing amplifiers 6 and 7 to the high voltage circuits presently to be mentioned, while connecting the low voltage inputs of the high voltage circuits to a reference potential. As shown in FIG. 2c, this reference potential is zero volts or ground potential in the illustrated case and provides a blanking value at that level just before the sawtooth wave goes below the zero line. The low voltage signals, as keyed (blanked) in the respective circuits 13 and 14, are then supplied through respective capacitors 18 and 19 in the case of the horizontal signal, and 21 and 22 in the case of the vertical signal, to the high voltage circuits for the respective deflection plates of each pair of opposite plates.

At the high voltage side of the coupling capacitors, there are signals such as shown in FIG. 2d which have lost their DC voltage component. In the absence of following clamping, the blanking signal value (or "keyed-in" signal value) lies in the illustrated case in a negative voltage range near 0.5 volts.

High voltage clamping circuits 23 and 24 for the horizontal deflection plates of one camera tube, and 26 and 27 for the vertical deflection plates of that camera tube, clamp and deflection signals by bringing the value keyed in by the circuits 13 and 14, as it appears on the high voltage side of the corresponding coupling capacitor, to a high voltage reference potential. A detailed description of this clamping operation is given below in connection with FIG. 3. As a result, a signal of the kind shown in FIG. 2e is made available at the outputs 28, 29, 31 and 32. In FIG. 2e the reference voltage to which the output wave is clamped is designated $U_{G3}$ and in the illustrated case, the positive peak voltage on that line is $U_{G3}+k.1.5V$ while the negative peak voltage is $U_{G3}-k.0.5V$. In these expressions, k is the amplifying factor of a signal amplifier included in the clamping circuit 23, 24, 26 or 27. This operation restores the DC voltage shift superimposed on the sawtooth wave signal in the low voltage stages. The outputs 28 and 29 are connected to the horizontal deflection plates and the outputs 31 and 32 to the vertical direction plates of one of the television camera tubes.

At the terminal 16 controlling the keying of the horizontal deflection waves, vertical scanning frequency control pulses could be supplied instead of the horizontal scanning frequency pulses, so that the horizontal scanning frequency waves, like the vertical scanning frequency waves would be blanked or keyed only in the vertical blanking interval of the video signals and then, of course, clamped only within the vertical blanking interval of the video signals. This is readily feasible, since the time constant produced in each case by capacitor and input resistance of a clamping circuit is sufficient for the transmission of the DC voltage correction signal for the horizontal scanning direction during an entire picture field. That has the advantage of providing a certain useful saving of cost and complication in connection with the horizontal keying and clamping pulses.

FIG. 3 shows in detail two clamping circuits for one scanning direction. The convenience of the components which also appear in the previous figures are designated with the same reference numerals. Each clamping circuit 23, 24 shown in FIG. 3 comprises a signal amplification stage 33, 34 and a clamping stage 36, 37 which lies in the feedback branch of the amplifier stage. The clamping circuits 36 and 37 respectively have differential amplifiers 38 and 39 and a pulse controlled clamping switch 41 or 42 which is controlled by pulses of the horizontal or vertical scanning frequency, as in the case of the corresponding blanking circuits 13 and 14 discussed in connection with FIG. 1. These clamping stages 36 and 37 are advantageously constituted, as shown in FIG. 3 in the illustrated case, by the use of regulating amplifiers 38, 39 with a current output (of the type known by the acronym OTA) which operate as a controlled current source. The amplifier stages 33 and 34 are provided with negative feedback respectively by the resistor combinations 43, 44 and 45, 46 which act as voltage dividers to supply a feedback voltage to the inverting inputs of the amplifiers. At the non-inverting inputs of these amplifiers, there is supplied a signal of the form shown in FIG. 2d as well as the clamp signal which fixes the DC level. The output of the amplifiers 33 and 34 are mirror image signals in the form of FIG. 2e as shown by the waveforms at the right of FIG. 3, as a result of the inverter 49 interposed between the respective low voltage sides of the capacitors 18 and 19.

The deflection signals are amplified at high average voltage by means of the respective high voltages $U_{G3}+U_B$ and $U_{G3}-U_B$ supplied at the voltage supply terminals marked with those voltages in FIG. 3, shown directly above and below the respective amplifiers 33 and 34. The output signals at the terminals 28 and 29 cannot have positive and negative peaks respectively going beyond these limit values. These output signals are clamped by means of the clamp stages 36 and 37 to the reference voltage value $U_{G3}$, by supplying the output signals of the amplifiers 33 and 34 to the inverting inputs of the regulating amplifiers 38 and 39 while at the corresponding non-inverting input, the reference potential $U_{G3}$ is applied in both cases.

During the horizontal or the vertical blanking interval, as the case may be, the switch 41 or 42, as the case may be, closes for an interval during which the capacitor 18 or 19 is charged or discharged by the output current of the regulating amplifier 36 or 37 until the voltage difference between the two inputs of the regulating amplifier 36 or 37 vanishes. In consequence, the reference voltage plateau "imprinted" in the signals as shown in FIG. 2d is compared with the reference voltage $U_{G3}$ and the input signal of the amplifier stage 33 and 34 is continually adjusted by regulation so that at the output of the amplifier 33 or 34, the reference plateau of the signal has the magnitude of the reference potential $U_{G3}$. By this operation, DC voltage drift of the signals amplifiers 33 and 34 is practically reduced to zero. DC voltage drift of the summing amplifiers is also fully compensated. Because of the necessary phase-operation of the deflection signals at the two deflection plates provided for one deflection direction, one of the corresponding pair of clamping circuits is provided, as already mentioned, with an inverting stage 49 ahead of the clamping and amplification stage (actually at the low voltage side of the coupling capacitors 19 and 22 as shown in FIGS. 1 and 3). The inverting stage 49 inverts the signal of the form shown in FIG. 2d to produce the inverted signal designated $\bar{d}$ which then is clamped and amplified to produce a signal $\bar{e}$ illustrated near the output terminal 29 in FIG. 3.

When the keying or blanking circuits 13 and 14 are both operated by pulses of the vertical scanning frequency, the clamping switches 41 and 42 for the horizontal deflection circuits are likewise be operated with pulses of the vertical scanning frequency. Since in a color television camera utilizing three camera tubes there are six pairs of deflection plates, twelve plates in all, to be supplied with corrected deflection voltages, it will be seen that the simplification of provision of correction voltages and particularly of the DC level correction voltages, in a manner free of possible DC voltage drifts of amplifiers and similar circuits, will be appreciated as a great step in simplification, economy and maintenance of precise alignment tubes of a color television camera accomplished by the present invention.

Although the invention has been described with reference to a particular illustrative example, it will be evident that in addition to the option of clamping the horizontal deflection voltages at the vertical scanning frequency in order to effect further savings, other variations and modifications of detail are possible within the inventive concept.

We claim:
1. Method of producing deflection signals for electrostatic deflection camera tubes for producing color video signals having horizontal (H) and vertical (V) video blanking intervals, said method including the steps of generating sawtooth deflection signals of horizontal (H) scanning frequency and of vertical (V) scanning frequency at low voltage, then superposing correction signals thereon to modify the signal position, magnitude and shape and thereby produce corrected horizontal (H) and vertical (V) deflection signals, followed by capacitively converting said corrected H and V deflection signals into high voltage horizontal (H) and vertical (V) deflection signals, and further comprising the steps of:
prior to the step of capacitively converting corrected H and V deflection signals into high voltage signals, blanking out said corrected H and V deflection signals and substituting a keyed-in low voltage reference voltage for intervals within the said respective H and V blanking intervals of said color video signals and after said converting step, clamping said high voltage H and V deflection signals to a high voltage reference potential in substantially the same intervals in which the respectively corresponding corrected H and V deflection signals were blanked out and said keyed-in low voltage reference voltage was substituted.

2. Method according to claim 1 wherein said intervals of blanking out said corrected H and V deflection signals occur at the beginning of the said respective H and V blanking intervals.

3. Method of producing deflection signals for electrostatic deflection television camera tubes for producing color video signals having horizontal (H) and vertical (V) video blanking intervals, said method including the steps of generating sawtooth deflection signals of horizontal (H) scanning frequency and of vertical (V) scanning frequency at low voltage, then superposing correction signals thereon to modify the signal position, magnitude and shape and thereby produce corrected horizontal (H) and vertical (V) deflection signals, followed by capacitively converting said corrected H and V deflection signals into high voltage horizontal (H) and vertical (V) deflection signals, and further comprising the steps of:
prior to the step of capacitively converting said corrected H and V deflection signals into high voltage H and V deflection signals, blanking out said corrected H and V deflection signals and substituting a keyed-in low voltage reference voltage for intervals within the said vertical blanking intervals of said color video signals and after said converting step, clamping said high voltage H and V deflection signals to a high voltage reference potential in substantially the same intervals in which the respectively corresponding corrected H and V deflection signals were blanked out and said keyed-in low voltage reference voltage was substituted.

4. Method as defined in claim 3, wherein said intervals of blanking out said corrected H and V deflection signals occur at the beginning of the said vertical blanking intervals.

5. Apparatus for correcting deflection signals supplied by synchronized horizontal and vertical scanning frequency sawtooth deflection signal generators for electrostatic deflection in respective camera tubes of a color television camera producing respective video signals each having horizontal blanking intervals and vertical blanking intervals respectively at horizontal (H) and vertical (V) scanning frequencies, comprising the following combination for provision of corrected high voltage horizontal (H) and vertical (V) deflection signals to each of said camera tubes of said color television camera:
summing circuit means (6, 7) for superimposing correction signals at low voltage on the respective deflection signals supplied by said horizontal scanning frequency sawtooth deflection signal generator (3) and said vertical scanning frequency sawtooth deflection signal generator (4) for respectively providing horizontal (H) and vertical (V) deflection signals corrected for position, magnitude and shape;

first blanking circuit means controlled by pulses at the horizontal scanning frequency respectively occurring within the horizontal blanking intervals of said video signals of said camera for briefly interrupting said corrected H deflection signals and keying in a low voltage reference voltage to produce modified corrected horizontal (H) deflection signals;

second blanking circuit means controlled by pulses at the vertical scanning frequency respectively occurring within the vertical blanking intervals of said video signals of said camera for briefly interrupting said corrected V deflection signals and keying in a low voltage reference voltage to produce modified corrected vertical (V) deflection signals; and means for converting said modified corrected H and V deflection signals into high voltage horizontal (V) and vertical (H) deflection signals, said means comprising coupling capacitors (18, 19; 21, 22), and circuit means for clamping the modified corrected H and V deflection signals after they have been transmitted through said capacitors to a high voltage reference voltage during the same intervals in which the respectively corresponding corrected H and V deflection signals were briefly interrupted and said low voltage reference voltage was keyed in by said respective blanking circuit means.

6. Apparatus as defined in claim 5, wherein each said blanking circuit means comprises a negative feedback amplifier (33, 34) having an input connected to one of said capacitors and an output connected to a deflection plate in one of said camera tubes, and a regulating amplifier (36, 37) connected in series with a clamping switch (41, 42) in a feedback path of said negative feedback amplifier, said regulating amplifier having an inverting input connected to the output of said negative feedback amplifier, a non-inverting input connected to said high voltage reference voltage, and an output connected to said clamping switch and, through said clamping switch, to the input of said negative feedback amplifier which is connected to said one of said capacitors, said clamping switch being controlled to close so as to clamp said input of said negative feedback amplifier to said high voltage reference voltage while the respectively corresponding corrected H and V deflection signals are briefly interrupted.

7. Apparatus for correcting deflection signals supplied by synchronized horizontal and vertical scanning frequency sawtooth deflection signal generators for electrostatic deflection in respective camera tubes of a color television camera producing respective video signals each having horizontal blanking intervals and vertical blanking intervals respectively at horizontal (H) and vertical (V) scanning frequencies, comprising the following combination for provision of corrected high voltage horizontal (H) and vertical (V) deflection signals to each of said camera tubes of said color television camera:

summing circuit means (6, 7) for superimposing correction signals at low voltage on the respective deflection signals supplied by said horizontal scanning frequency sawtooth deflection signal generator (3) and said vertical scanning frequency sawtooth deflection signal generator (4) for respectively providing horizontal (H) and vertical (V) deflection signals corrected for position, magnitude and shape;

first blanking circuit means controlled by pulses at the vertical scanning frequency respectively occurring within the vertical blanking intervals of said video signals of said camera for briefly interrupting said corrected H deflection signals and keying in a low voltage reference voltage to produce modified corrected horizontal (H) deflection signals;

second blanking circuit means controlled by said pulses at the vertical scanning frequency respectively occurring within the vertical blanking intervals of said video signals of said camera for briefly interrupting said corrected V deflection signals and keying in a low voltage reference voltage to produce modified corrected vertical (V) deflection signals; and means for converting said modified corrected H and V deflection signals into high voltage horizontal (H) and vertical (V) deflection signals, said means comprising coupling capacitors (18, 19; 21, 22), and circuit means for clamping the modified corrected H and V deflection signals after they have been transmitted through said capacitors to a high voltage reference voltage during the same intervals in which the respectively corresponding corrected H and V deflection signals were briefly interrupted and said low voltage reference voltage was keyed in by said respective blanking circuit means.

8. Apparatus as defined in claim 7, wherein each said blanking circuit means comprises a negative feedback amplifier (33, 34) having an input connected to one of said capacitors and an output connected to a deflection plate in one of said camera tubes, and a regulating amplifier (36, 37) connected in series with a clamping switch (41, 42) in a feedback path of said negative feedback amplifier, said regulating amplifier having an inverting input connected to the output of said negative feedback amplifier, a non-inverting input connected to said high voltage reference voltage, and an output connected to said clamping switch and, through said clamping switch, to the input of said negative feedback amplifier which is connected to said one of said capacitors, said clamping switch being controlled to close so as to clamp said input of said negative feedback amplifier to said high voltage reference voltage while the respectively corresponding corrected H and V deflection signals are briefly interrupted.

* * * * *